United States Patent

Thapar et al.

[11] Patent Number: 5,914,989
[45] Date of Patent: Jun. 22, 1999

[54] PRML SYSTEM WITH REDUCED COMPLEXITY MAXIMUM LIKELIHOOD DETECTOR

[75] Inventors: Hemant K. Thapar; Shih-Ming Shih, both of San Jose; Kwok W. Yeung, Milpitas, all of Calif.

[73] Assignee: NEC Electronics, Inc., Santa Clara, Calif.

[21] Appl. No.: 08/800,989

[22] Filed: Feb. 18, 1997

[51] Int. Cl.$^6$ .................................................. H03M 13/12
[52] U.S. Cl. ........................ 375/341; 371/43.6; 371/43.7
[58] Field of Search ..................... 375/262, 265, 375/290, 341; 371/43.7, 43.6; 341/51

[56] References Cited

U.S. PATENT DOCUMENTS

| | | | |
|---|---|---|---|
| 4,015,238 | 3/1977 | Davis | 340/146.1 AQ |
| 4,571,734 | 2/1986 | Dolivo et al. | 375/18 |
| 4,609,907 | 9/1986 | Adler et al. | 340/347 |
| 4,644,564 | 2/1987 | Dolivo et al. | 375/18 |
| 4,829,575 | 5/1989 | Lloyd | 381/41 |
| 5,027,374 | 6/1991 | Rossman | 375/94 |
| 5,196,849 | 3/1993 | Galbraith | 341/59 |
| 5,220,294 | 6/1993 | Ichikawa | 331/17 |
| 5,220,466 | 6/1993 | Coker et al. | 360/46 |
| 5,233,482 | 8/1993 | Galbraith et al. | 360/46 |
| 5,241,309 | 8/1993 | Cideciyan et al. | 341/59 |
| 5,258,933 | 11/1993 | Johnson et al. | 364/602 |
| 5,276,408 | 1/1994 | Norimatsu | 331/8 |
| 5,291,499 | 3/1994 | Behrens et al. | 371/43 |
| 5,341,387 | 8/1994 | Nguyen | 371/45 |
| 5,359,631 | 10/1994 | Behrens et al. | 375/120 |
| 5,375,145 | 12/1994 | Abbott et al. | 375/98 |
| 5,408,502 | 4/1995 | How | 375/340 |
| 5,408,503 | 4/1995 | Kahlman | 375/340 |
| 5,410,556 | 4/1995 | Yeh et al. | 371/43 |
| 5,412,669 | 5/1995 | Foland, Jr. | 371/43 |
| 5,414,738 | 5/1995 | Bienz | 375/341 |
| 5,418,795 | 5/1995 | Itakura et al. | 371/30 |

(List continued on next page.)

OTHER PUBLICATIONS

"Timing Recovery in Digital Synchronous Data Receivers", Kurt H. Mueller, et al., IEEE Transactions on Communications, vol. COM–24, No. 5, pp. 516–531 (May 1976).

"Fast Timing Recovery for Partial–Response Signalling Systems", F. Dolivo et al., IBM Research Division, Zurich Research Laboratory, pp. 0573–0575, 0577 CH2655–9/89/0000–0573 IEEE (1989).

"Fully Integrated Analog Filters Using Bipolar–JFET Technology", Khen–Sang Tan, et al., IEEE Journal of Solid–State Circuits, vol. SC–13, No. 6, (Dec. 1978).

"The Viterbi Algorithm", G. David Forney, Jr., Proceedings of the IEEE, vol. 61, No. 3, pp. 268–278 (Mar. 1973).

(List continued on next page.)

*Primary Examiner*—Don N. Vo
*Attorney, Agent, or Firm*—Skjerven, Morrill,MacPherson Franklin and Friel

[57] ABSTRACT

A less complex maximum likelihood detector can be implemented in a partial response maximum likelihood (PRML) system without degrading system performance by saturating y values from a gain control loop to a smaller range before the y values are supplied to the maximum likelihood detector. A quantity "D" of a maximum likelihood detector operating in accordance with a partial response scheme has a particular relationship with respect to the maximum (ymax) of the y input values processed by the maximum likelihood detector. In some embodiments, y values from a gain control loop are saturated from a first larger range (defined by ymaxreal) to a second smaller range (defined by a value SAT) which is at least as great as the ymax of the ideal input signal (ymaxideal) for the partial response scheme. The saturated y values are provided to the maximum likelihood detector. The D of the maximum likelihood detector (given the partial response scheme and the smaller range of y values) is in a different "two to the power of an integer range" than the D would have been given the same partial response scheme but the larger range of y values.

13 Claims, 7 Drawing Sheets

U.S. PATENT DOCUMENTS

| | | | |
|---|---|---|---|
| 5,422,760 | 6/1995 | Abbott et al. | 360/46 |
| 5,430,768 | 7/1995 | Minuhin et al. | 375/340 |
| 5,432,804 | 7/1995 | Diamondstein et al. | 371/43 |
| 5,432,820 | 7/1995 | Sugawara et al. | 375/341 |
| 5,436,932 | 7/1995 | Sogo et al. | 375/341 |
| 5,438,460 | 8/1995 | Coker et al. | 360/46 |
| 5,444,721 | 8/1995 | Okanoue et al. | 371/43 |
| 5,446,746 | 8/1995 | Park | 371/43 |
| 5,450,445 | 9/1995 | Ushirokawa | 375/324 |
| 5,453,997 | 9/1995 | Roney, IV | 371/41 |
| 5,459,679 | 10/1995 | Ziperovich | 361/602 |
| 5,461,644 | 10/1995 | Bergmans et al. | 375/341 |
| 5,469,452 | 11/1995 | Zehavi | 371/43 |
| 5,502,735 | 3/1996 | Cooper | 371/43 |
| 5,504,784 | 4/1996 | Niyogi et al. | 375/341 |
| 5,508,993 | 4/1996 | Hayashi et al. | 369/124 |
| 5,509,020 | 4/1996 | Iwakiri et al. | 371/43 |
| 5,521,945 | 5/1996 | Knudson | 375/341 |
| 5,539,780 | 7/1996 | Dutkiewicz | 375/340 |

OTHER PUBLICATIONS

"Turbo–PRML: A Compromise EPRML Detector", Roger Wood, IEEE Transactions on Magnetics, vol. 29, No. 6, pp. 4018–4020 (Nov. 1993).

"Implementation of a Digital Read/Write Channel with EEPR4 Detection", Dave Welland, et al., IEEE Transactions on Magnetics, vol. 31, No. 2, pp. 1180–1185 (Mar. 1995).

"A High Speed, Low Power PRML Read Channel Device", Jeff Sonntag, et al., IEEE Transactions on Magnetics, vol. 31, No. 2, pp. 1186–1195 (Mar. 1995).

"An Experimental 180 Mb/sec PRML Channel for Magnetic Recording", John Hong et al., IEEE Transactions on Magnetics, vol. 27, No. 6, pp. 4532–4537 (Nov. 1991).

"A 3.0 V 40 Mb/s Hard Disk Drive Read Channel IC", Geert A. De Veirman, et al., IEEE Journal of Solid–State Circuits, vol. 30, No. 7, pp. 788–799 (Jul. 1995).

"Exact Bounds for Viterbi Detector Path Metric Differences", Paul H. Seigel, et al., CH2977–7/91/0000–1093 IEEE, pp. 1093–1096, (1991).

"Analog Front–End Architectures for High–Speed PRML Magnetic Read Channels", Patrick K.D. Pai, et al., IEEE Transactions on Magnetics, vol. 31, No. 2, (Mar. 1995).

"Implementation of PRML in a Rigid Disk/Drive", J.D. Coker, et al., IEEE Transactions on Magnetics, vol. 27, No. 6, pp. 4538–4543, (Nov. 1993).

"A Class of Partial Response Systems for Increasing Storage Density in Magnetic Recording", H.K. Thapar et al., IEEE Transactions on Magnetics, vol. Mag. 23, No. 5, pp. 3666–3668 (Sep. 1987).

"Integrating a Partial Response Maximum Likelihood Data Channel into the IBM 0681 Disk Drive", J.C. Coker, et al., Presented at the Twenty–Fourth Asilomar Conference on Signals, Systems & Computers, The Computer Society of the IEEE, vol. 2 of 2, pp. 674–677, (Nov. 1990).

"A PRML System for Digital Magnetic Recording", Roy D. Cideciyan, et al., IEEE Journal on Selected Areas in Communications, vol. 10, No. 1, pp. 38–56 (Jan. 1992).

"A Survey of Digital Phase–Locked Loops", William C. Lindsey, et al., Proceedings of the IEEE, vol. 69, No. 4, pp. 410–431 (Apr. 1981).

"Design and Performance of a VLSI 120 Mb/s Trellis–Coded Partial Response Channel", J.W. Rae, et al., IEEE Transactions on Magnetics, vol. 31, No. 2, pp. 1208–1214, (Mar. 1995).

"Error Rate Performance of Experimental Gigabit Per Square Inch Recording Components", Thomas D. Howell, et al., IEEE Transactions on Magnetics, vol. 26, No. 5, pp. 2298–2302 (Sep. 1990).

"Parallelism in Analog and Digital PRML Magnetic Disk Read Channel Equalizers", Gregory T. Uehara, et al., IEEE Transactions on Magnetics, vol. 31, No. 2, pp. 1174–1179 (Mar. 1995).

"PERD: Partial Error Response Detection", Takushi Nishiya, et al., IEEE Transactions on Magnetics, vol. 31, No. 6, pp. 3042–3044 (Nov. 1995).

"Realization of a 1–V Active Filter Using a Linearization Technique Employing Plurality of Emitter–Coupled Pairs", Hiroshi Tanimoto, et al., IEEE Solid–State Circuits, vol. SC–26, No. 7 pp. 937–945 (Jul. 1991).

"HD153061TF 130–Mbps PRNL Data Channel Processor", Hitachi Advance Information, Rev. D, pp. 1–3, 29–34, (Jul. 1995).

"A Digital Chip with Adaptive Equalizer for PRML Detection in Hard–Disk Drives", William L. Abbott, et al., ISSC94, Session 17, Disk–Drive Electronics, Paper FA 17.5 pp. 284–285 (1994).

"A 16MB/s PRML Read/Write Data Channel", Raymond A, Richetta, et al., ISSCC95, Session 5, Disk and Arithmetic Signal Processor, Paper WP 5.1, pp. 78–79 and 58–59 (1995).

"*Reduced Complexity Viterbi Detector Architectures for Partial Response Signalling*", Gerhard Fettweis, et al., Paper presented at Globecom Conference '95, pp. 559–563 (1995).

"*Improving Performance of PRML/EPRML Through Noise Prediction*", E. Eleftheriou and W. Hirt, IBM Research Division, (1996).

"*Reduced Complexity Viterbi Detector Architectures for Partial Response Signalling*", Gerhard Fettweis, et al., IBM Research Division, pp. 1–2, 4, 6, 8, 10, 12, 14, 16, 18, 20, 22, 24, 26, 28, 30 (1995).

```
X  0 0 0 1 1 1 1 0 0 0 0 1 1 0 0 0 1 0 1      BITS OFF DISK
P    0 1 1 0 0 -1 -1 0 0 1 1 -1 -1 0 1 0 0    ← P VALUES
T  0 1⁺0⁺0⁺0⁺1⁻ 0⁻ 0⁻ 0⁻ 1⁺ 0⁺ 1⁻ 0⁻ 0⁻ 1⁺ 1⁻ 1⁺
                                               TRANSITIONS OF X VALUES
```

FIGURE 5

| TO<br>FROM | 0+ | 1+ | 0− | 1− |
|---|---|---|---|---|
| 0+ | 0 | F | F | −1 |
| 1+ | 1 | F | F | 0 |
| 0− | F | 1 | 0 | F |
| 1− | F | 0 | −1 | F |

T VALUES

P VALUES IN TABLE

F = FORBIDDEN TRANSITION

| INPUT NORMALIZED | INTO SATURATE BLOCK | OUT OF SATURATE BLOCK | INPUT NORMALIZED | INTO SATURATE BLOCK | OUT OF SATURATE BLOCK |
|---|---|---|---|---|---|
| 2.500 | 010011 | 01111 | −0.125 | 111111 | 11111 |
| 2.375 | 010010 | 01111 | −0.250 | 111110 | 11110 |
| 2.250 | 010001 | 01111 | −0.375 | 111101 | 11101 |
| 2.125 | 010000 | 01111 | −0.500 | 111100 | 11100 |
| 2.000 | 001111 | 01111 | −0.625 | 111011 | 11011 |
| 1.875 | 001110 | 01110 | −0.750 | 111010 | 11010 |
| 1.750 | 001101 | 01101 | −0.875 | 111001 | 11001 |
| 1.625 | 001100 | 01100 | −1.000 | 111000 | 11000 |
| 1.500 | 001011 | 01011 | −1.125 | 110111 | 10111 |
| 1.375 | 001010 | 01010 | −1.250 | 110110 | 10110 |
| 1.250 | 001001 | 01001 | −1.375 | 110101 | 10101 |
| 1.125 | 001000 | 01000 | −1.500 | 110100 | 10100 |
| 1.000 | 000111 | 00111 | −1.625 | 110011 | 10011 |
| 0.875 | 000110 | 00110 | −1.750 | 110010 | 10010 |
| 0.750 | 000101 | 00101 | −1.875 | 110001 | 10001 |
| 0.625 | 000100 | 00100 | −2.000 | 110000 | 10000 |
| 0.500 | 000011 | 00011 | −2.125 | 101111 | 10000 |
| 0.375 | 000010 | 00010 | −2.250 | 101110 | 10000 |
| 0.250 | 000001 | 00001 | −2.375 | 101101 | 10000 |
| 0.125 | 000000 | 00000 | −2.500 | 101100 | 10000 |

FIGURE 12

PRML SYSTEM WITH REDUCED COMPLEXITY MAXIMUM LIKELIHOOD DETECTOR

FIELD OF THE INVENTION

This invention relates to maximum likelihood detectors.

BACKGROUND INFORMATION

Figure 1:
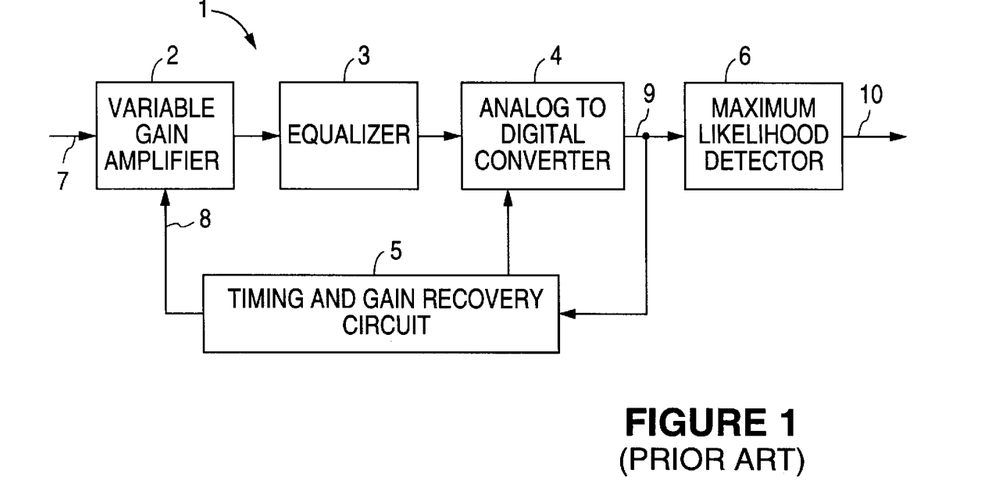
FIG. 1 is a simplified diagram of a PRML (Partial Response Maximum Likelihood) system.

FIG. 1 is a simplified diagram of a PRML (Partial Response Maximum Likelihood) system 1 usable in connection with reading information from a hard disk. PRML system 1 includes a variable gain amplifier 2, an equalizer 3, an analog-to-digital converter 4, a timing and gain recovery circuit 5 and a maximum likelihood detector 6. A head (not shown) moving over the surface of a magnetic media on the hard disk surface outputs a signal. This signal is amplified by a preamplifier (not shown) and is supplied to the variable gain amplifier 2 via input 7.

PRML system 1 involves a timing control loop (including analog-to-digital converter 4 and timing and gain recovery circuit 5) which controls the analog-to-digital converter to take samples of the input signal at the correct times in accordance with the partial response scheme used (PR4, EPR4 and $E^2PR4$ are partial response schemes). PRML system 1 also involves an automatic gain control loop (including variable gain amplifier 2, equalizer 3, analog-to-digital converter 4, and timing and gain recovery circuit 5) which maintains the correct amplification level in the system. In general, the gain of the variable gain amplifier is controlled via input 8 so that an input signal of maximum amplitude under normal operating conditions on input 7 does not result in the analog-to-digital converter outputting its maximum digital value on output 9. Rather, analog-to-digital converter "headroom" is reserved so that the gain control loop can detect a high signal level and reduce loop gain accordingly before the signal is clipped. Equalizer 3 functions to reshape the input pulses of the input signal in accordance with the partial response scheme employed. Maximum likelihood detector 6 (for example, a Viterbi detector) receives the samples from the analog-to-digital converter and determines the input pattern most consistent with the observed samples. This determined most likely input pattern is output in the form of a stream of digital values on the output 10 of the maximum likelihood detector 6.

The maximum likelihood detector 6 is typically quite complex. Accordingly, techniques are sought for reducing the complexity (and therefore size as implemented in integrated circuit form) of the maximum likelihood detector in a PRML system.

SUMMARY

A less complex maximum likelihood detector can be implemented in a partial response maximum likelihood (PRML) system without degrading system performance by saturating y values from a gain control loop to a smaller range before the y values are supplied to the maximum likelihood detector. A quantity "D" of a maximum likelihood detector operating in accordance with a partial response scheme has a particular relationship with respect to the maximum (ymax) of the y input values processed by the maximum likelihood detector. In some embodiments, y values from a gain control loop are saturated from a first larger range (defined by ymaxreal) to a second smaller range (defined by a value SAT) which is at least as great as the ymax of the ideal input signal (ymaxideal) for the partial response scheme. The saturated y values are provided to the maximum likelihood detector. The D of the maximum likelihood detector (given the partial response scheme and the smaller range of y values) is in a different "two to the power of an integer range" than the D would have been given the same partial response scheme but the larger range of y values. In other embodiments, the range of y values is not reduced sufficiently for the D of the maximum likelihood detector to be in a different "two to the power of an integer range", yet the complexity of the resulting maximum likelihood detector is nonetheless reduced.

This summary does not purport to define the invention. The invention is defined by the claims.

DETAILED DESCRIPTION OF THE PREFERRED EMBODIMENTS

Figure 2:
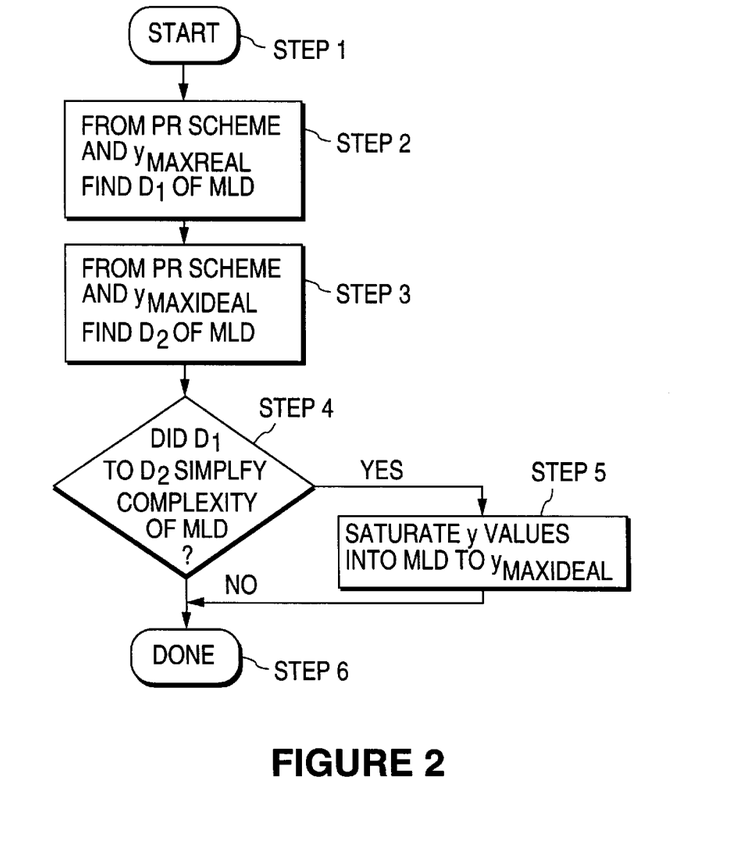
FIG. 2 is a flow chart illustrating a method for implementing a low complexity maximum likelihood detector in a PRML system without reducing system performance.

FIG. 2 is a flow chart illustrating a method for reducing the complexity of a maximum likelihood detector in a PRML system without reducing system performance. The method starts at step 1. Next (see step 2), given a particular partial response scheme (PR4, EPR4 and $E^2PR4$ are examples of partial response schemes) and a given ymax going into the maximum likelihood detector, a quantity called the "D" of the maximum likelihood detector is determined. The value of ymax is the actual maximum value (ymaxreal) which is possible at the output of the analog-to-digital converter. This maximum value (ymaxreal) possible at the analog-to-digital converter may, for example, be determined by how much headroom is required in the gain control loop. It may in some embodiments, however, be determined by requirements of other circuit components. How the quantity "D" can be determined given the partial response scheme and the value of ymax is explained further below.

Next (see step 3), the "D" of a maximum likelihood detector is determined given the partial response scheme used in step 2 but using the ideal maximum (ymaxideal) of the y values supplied to the maximum likelihood detector.

In the PR4 partial response scheme, for example, the ideal y values are (−1, 0, +1). The value of ymaxideal for PR4 is therefore 1. In the EPR4 partial response scheme, for example, the ideal y values are (−2, −1, 0, +1, +2). The value of ymaxideal for EPR4 is therefore 2. In the $E^2PR4$ partial response scheme, for example, the ideal y sample values are (−3, −2, −1, 0, +1, +2, +3). The value of ymaxideal for $E^2PR4$ is therefore 3. The ymaxideal for other partial response schemes are known in the art and the ymaxideal for an arbitrary response scheme (having a pulse waveshape given by a desired polynomial) can be easily determined by finding the maximum of the isolated pulse waveshape at the sample points.

Next (see step 4), it is determined if changing D from $D_1$ (the D determined in step 2) to $D_2$ (the D determined in step 3) would reduce the complexity of the maximum likelihood detector. In one embodiment, if the value of D is in a smaller "two to the power of an integer range", then it is determined that the complexity of the maximum likelihood detector would be reduced. A D of 9, for example, is greater than $2^3$ but is less than $2^4$. A D of 12, for example, is also greater than $2^3$ and less than $2^4$. Changing D from 12 to 9 therefore would not result in the D being in a smaller "two to the power of an integer range". A D of 18, on the other hand, is greater than $2^4$. Changing D from 18 to 9 therefore does result in D being in a smaller "two to the power of an integer range".

If (see step 5) changing D from $D_1$ to $D_2$ is determined to reduce the complexity of the maximum likelihood detector, then the y values are saturated before they are supplied to the input of the maximum likelihood detector. In one embodiment, the y values are saturated to ymaxideal such that y values having magnitudes greater than ymaxideal are passed to the maximum likelihood detector as ymaxideal (and such that y values having magnitudes smaller than −ymaxideal are passed to the maximum likelihood detector as −ymaxideal). Saturating the y values supplied to the maximum likelihood detector in this way will not reduce system performance.

If, on the other hand, it is determined (see step 4) that changing D from $D_1$ to $D_2$ will not reduce the complexity of the maximum likelihood detector, then the y values are not saturated and the method is completed (see step 6). It is to be understood that the determinations of steps 2 and 3 can be determined in any order and that step 3 can precede step 2. Also, in some embodiments, the y values above +ymaxideal are saturated to another value (+SAT) between +ymaxideal and +ymaxreal and the y values below −ymaxideal are saturated to another value (−SAT) between −ymaxideal and −ymaxreal. It is also understood that the positive and negative values of ymaxideal need not have the same absolute values, rather +ymaxideal may have an absolute value greater than or smaller than the absolute value of −ymaxideal. Accordingly, positive y values may be saturated to +ymaxideal and the negative y values may be saturated to −ymaxideal where the absolute values of +ymaxideal and −ymaxideal differ.

Figure 3:
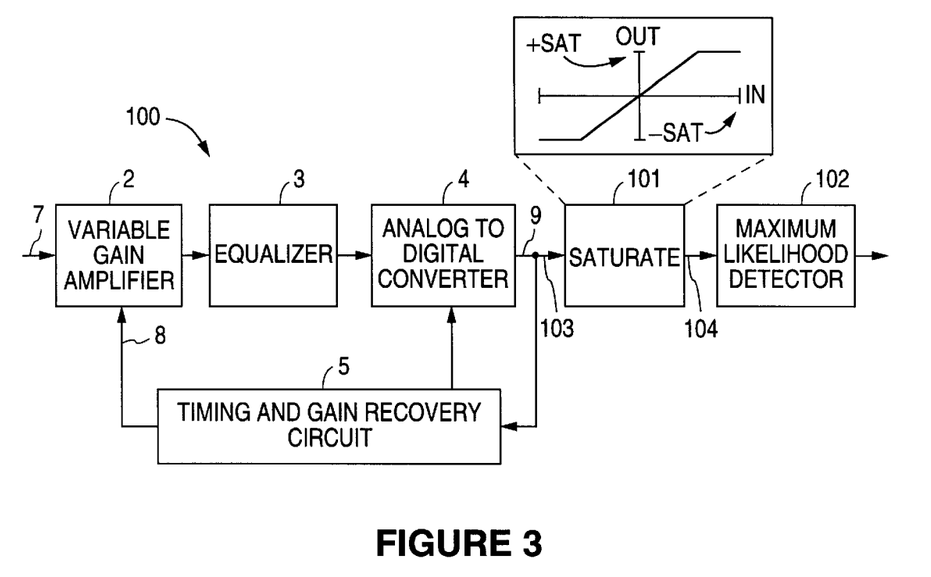
FIG. 3 is a simplified diagram of a PRML system in accordance with an embodiment of the invention.

FIG. 3 is a simplified diagram of a PRML system 100 in accordance with an embodiment of the invention. A saturate block 101 is added and a different (presumably less complex) maximum likelihood detector 102 is provided. The y values on the input 103 of saturate block 101 are in the range between −ymaxreal and +ymaxreal. The y values above +SAT are output from saturate block 101 on output 104 as +SAT and the y values below −SAT are output from saturate block 101 on output 104 as −SAT. (In some embodiments, +SAT is +ymaxideal, and −SAT is −ymaxideal.) Had the maximum likelihood detector been implemented to receive y values in the −ymaxreal to −ymaxreal range (given the same partial response scheme), then the D of the maximum likelihood detector would have been in a greater "two to the power of an integer range" and the maximum detector would have been more complex.

In some embodiments, the maximum likelihood detector is a Viterbi detector. Any suitable Viterbi architecture can be implemented. For additional details on a gain control loop, see the application entitled "Methods And Structure For Combined Analog And Digital Automatic Gain Control In Sampled-Data Receivers", Ser. No. 08/693,587, filed Aug. 1, 1996, by Shih, Chern, Cantreras and Rae (the content of which is incorporated herein by reference). For additional details on a timing control loop, see the application entitled "Methods And Structure For Sampled-Data Timing Recovery With Reduced Complexity And Latency", Ser. No. 08/695,327, filed Aug. 1, 1996, by Shih, Pan and Chern (the content of which is incorporated herein by reference). For additional details on equalization, see the application entitled "Method And Apparatus For Adaptively Processing The Readback Signal In A Read Channel Device For Digital Storage", Ser. No. 08/690,950, filed Aug. 1, 1996, by Shih, Thapar and Contreras (the content of which is incorporated herein by reference).

Figure 4:
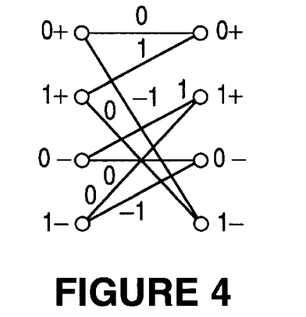
FIG. 4 is a diagram of the Viterbi trellis for the PR4 partial response scheme.

FIG. 4 is a diagram of the Viterbi trellis for the PR4 partial response scheme. There are four states (0+, 1+, 0−, 1−). A transition occurs from the leftmost four states to the rightmost four states in a "symbol interval" T, the time between consecutive y values as received by the Viterbi detector. The Viterbi detector operates by determining the "shortest" (typically the minimum accumulated squared error) path through the trellis between the noisy received y value sequence (received symbol sequence) and the allowed noise-free y value sequence (noise-free symbol sequence). To proceed to the states at time (n+1)T in the trellis, all prior time nT survivor metrics are extended by computing the metrics (lengths) of the extended path segments into each state. The metric of each extended path segment is computed by adding the time nT survivor metric and the associated branch metric (the branch metric typically equals the squared error between the received y value at time (n+1)T and the associated noise-free branch y value at time (n+1)T). The metrics of the two extended path segments to the same state are compared and the smallest of these is retained, representing the time (n+1)T survivor to that state. This procedure is recursively repeated for each state for time (n+2)T, time (n+3)T, and so on. For additional details on the Viterbi algorithm and trellis, see "PRML: A Practical Approach - Introduction to PRML Concepts and Measurements" by Alexander Taratorin, Guzik Technical Enterprises, 4620 Fortran Drive, San Jose, Calif. 95134, 1995 (the content of which is incorporated herein by reference).

Conventional Viterbi detectors use a number of add-compare-select units (ACS) equal to the number of "states" in the Viterbi trellis. A conventional ACS unit generally performs three operations (add, compare, select) within a y value interval. The achievable speed of such an ACS therefore depends in part upon the speed of the available semiconductor technology and the number of logical operations required in the ACS unit per y value interval, which in turn depends upon the finite precision requirements of the survivor metrics. Since the compare operation performed in the ACS relies on the relative magnitudes of the survivor metrics, and not their absolute values, the finite precision requirement for the survivor metric is usually determined by the maximum difference between pairs of survivor metrics leading to the same state. As set forth in the paper "Exact Bounds for Viterbi Detector Path Metric Differences", by P. Siegel, C. Shung, T. Howell, and H. Thapar, Proc. 1991

IEEE Intl. Conference on Acoustics, Speech, and Signal Processing, Toronto, May 1991, pages 1093–1096 (the content of which is incorporated herein by reference), this maximum difference is uniformly bounded in magnitude by the fixed quantity D. Interestingly, D is independent of the number of ACS recursions even though the absolute value of the survivor metric to each state is potentially unbounded. The number of bits required for representing the survivor metrics in the ACS units is therefore dependent upon the value of D. The fewer the number of bits, the lower the hardware complexity and the number of logical levels in the ACS unit.

The value of D cannot be chosen to be arbitrarily small without degrading system performance. The extent to which D can be reduced without degrading system performance depends upon the range of y values at the input of the Viterbi detector and the partial response scheme used. As set forth in the paper "Exact Bounds for Viterbi Detector Path Metric Differences", analysis has indicated that the value of D depends linearly upon the range of the y values processed by the Viterbi detector (the range between −ymaxideal and +ymaxideal). D is 2(ymaxideal +1) for PR4. D is 4(ymaxideal) for EPR4. For other communication or storage systems, the value of D as a function of ymaxideal may be determined empirically or via linear programming (see the paper entitled "Exact Bounds for Viterbi Detector Path Metric Differences").

Figure 5:
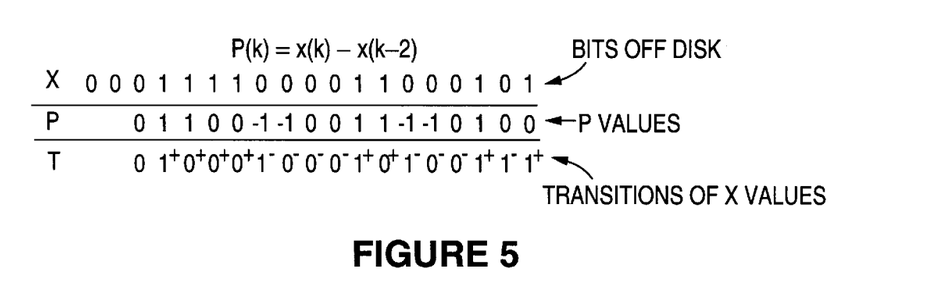
FIGS. 5–9 illustrate how the quantity D of a maximum likelihood detector may be found.
Figure 6:
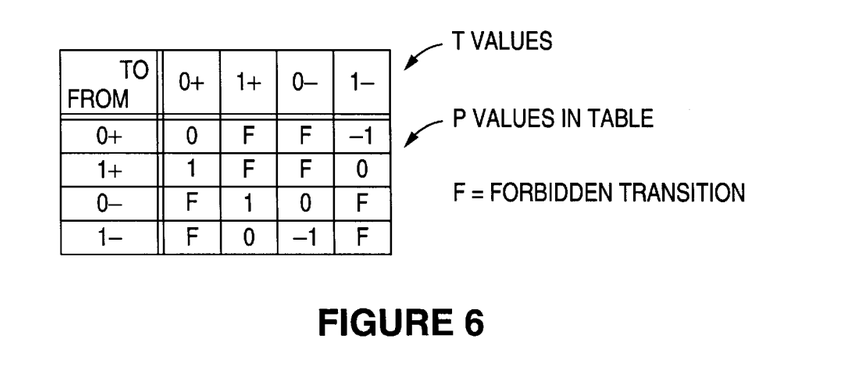

FIGS. 5 through 9 illustrate how D may be found. The PR4 partial response scheme is chosen for the example to simplify the explanation for teaching purposes but it is understood that the technique set forth is equally applicable to other partial response schemes. The formula in FIG. 5 indicates how noise-free P values (noise-free symbols) are determined from a sequence of processed and sampled X values received from the hard disk. The values T indicate transitions of the X values. A 1 indicates that a transition occurred, whereas a 0 indicates that a transition did not occur. A trailing + indicates that the last transition was a positive transition, whereas a trailing − indicates that the last transition was a negative transition. The information from FIG. 5 is shown in tabular form in FIG. 6. An "F" in the table indicates a forbidden state. It is, for example, impossible to transition from a state where the last transition was a positive transition (see "From" state 0+) to a state where there was not a new transition yet the last transition was a negative transition (see the "To" state 0−). The information from the table of FIG. 6 is presented in the trellis of FIG. 4. The "From" states are shown in the lefthand column, the "To" states are shown in the righthand column, and the P values which cause transitions from column to column label the corresponding lines between states.

Figure 7:
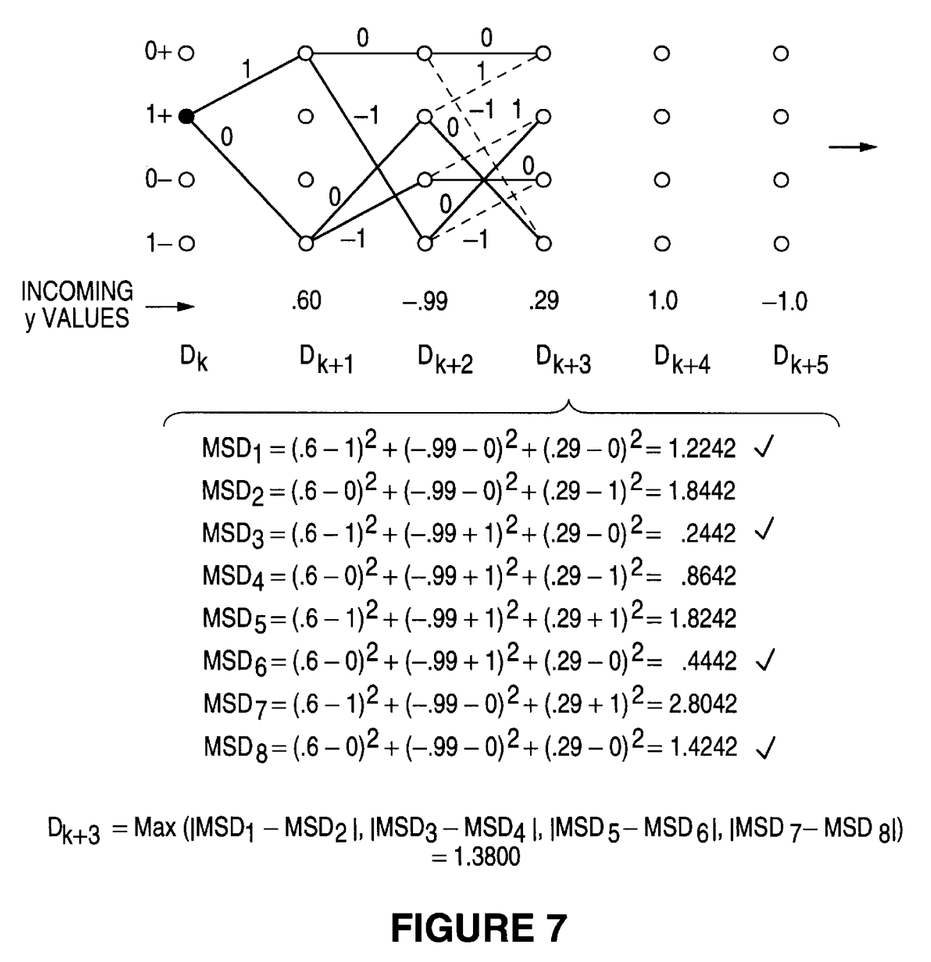

FIG. 7 illustrates the determination of a Dn value for time $(k+3)T$ for a sequence of incoming noisy y values (0.60, −0.99, 0.29, 1.0, −1.0 . . . ) In the example, it is assumed that the correct state at time k(T) is 1+ (a positive transition was received at time (k)T). The two possible transitions from state 1+ at time (k)T are shown, as are the following possible transitions. For each of the four possible states at time (k+3)T, the mean squared difference (MSD) is determined (see the text "PRML: A practical Approach - Introduction to PRML Concepts and Measurements", for additional information). The path of the two possible paths having the smallest MSD (the more likely path) to each of the states at time (k+3)T is retained and the larger one (the less likely one) is discarded. Discarded paths are illustrated as dashed lines.

To determine the value of Dk+3 (see FIG. 7), the absolute value of the difference between the MSDs for the two paths to each state at time (k+3)T is taken. This yields four differences in the trellis of FIG. 7. The largest of these four differences (1.3800) can be calculated as Dk+3.

Figure 8:
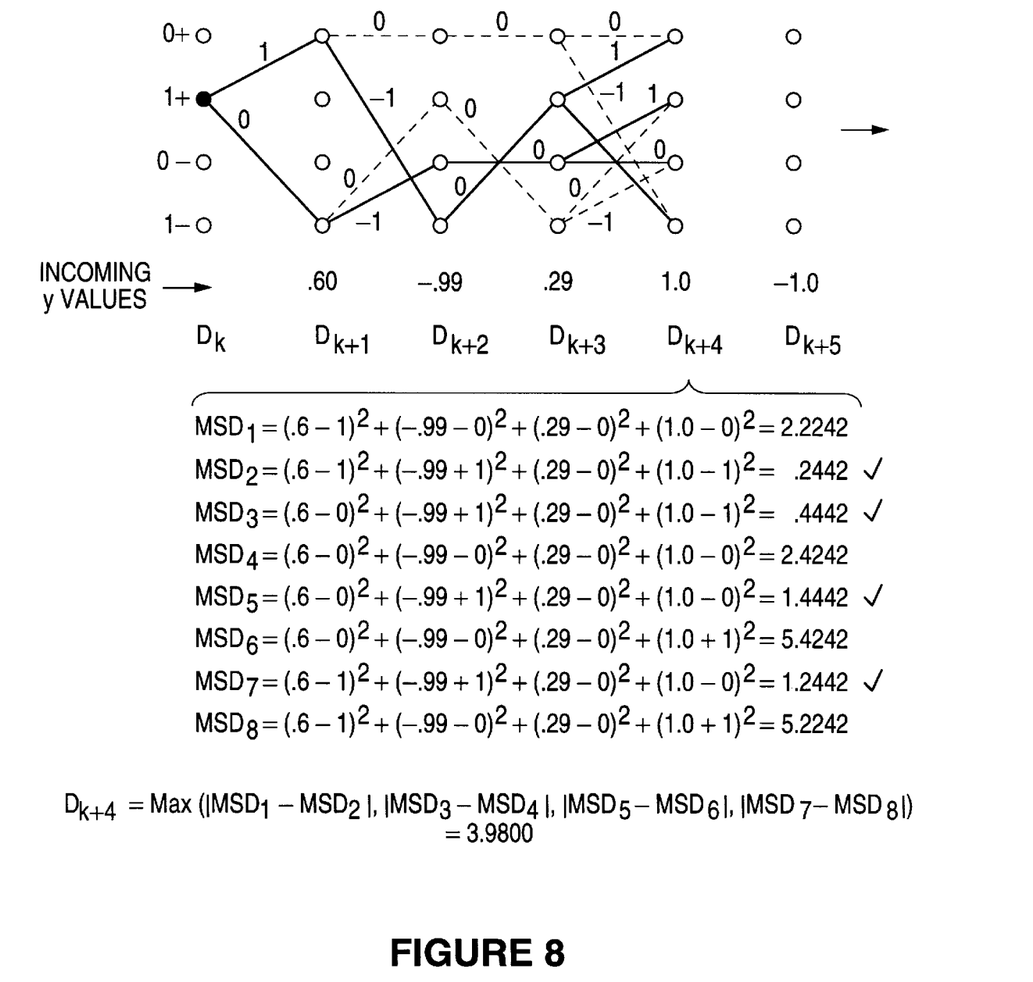

FIG. 8 illustrates the determination of the next Dn value. The possible branch paths are added to the trellis from the retained paths of FIG. 7. The mean square difference of each of the paths to each state at time (k+4)T from the 1+ state at time (k)T is determined. Again, where two paths converge at a state at time (k+4)T, the path having the smaller MSD is retained and the path having the larger MSD is discarded. The value of Dk+4 (3.9800) is determined as illustrated in FIG. 8.

Figure 9:
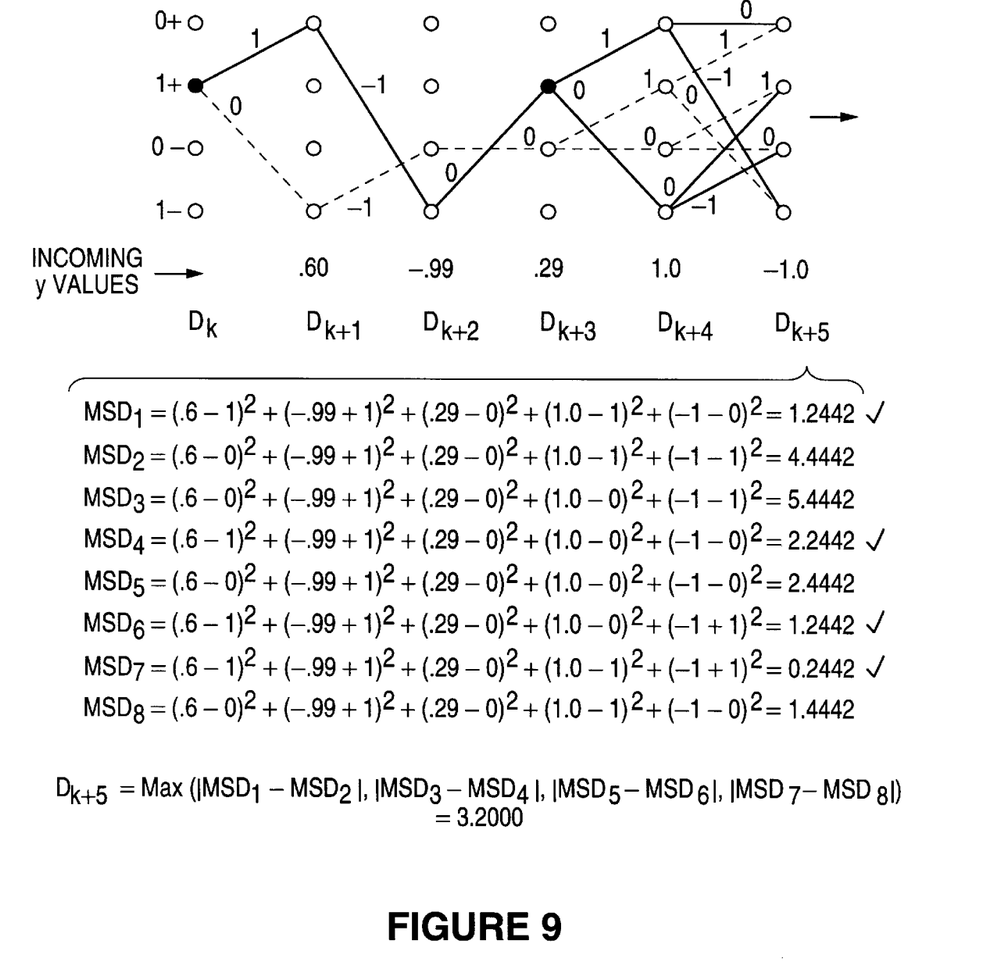

FIG. 9 illustrates the determination of the next Dn value. As before, the branch paths are added to the trellis from the retained paths of FIG. 8. The mean square difference of each of the paths to each state at time (k+5)T from the 1+ state at time (k)T is determined. Where two paths converge at a state at time (k+5)T, the path having the smaller MSD is retained and the path having the larger MSD is discarded. When the discarded paths are shown in dashed lines, it is apparent that all the remaining paths pass through the 1+ state at time (k+3)T. The Viterbi detector therefore determines the most likely y value sequence from time (k)T to (k+3)T (shown in the solid line). The process is repeated now with the assumed originating state being state 1+ at time (k+3)T. The value of Dk+5 (3.2000) is determined as illustrated in FIG. 9.

This method is repeated for an input y value sequence which varies throughout the y value range for which the D of the Viterbi detector is sought. The method can be programmed into a computer and the method executed for a protracted period. The largest value of the Dn values calculated through this period will, as the computer executes over time, converge to the value D. The largest of the Dk+3 to Dk+5 values calculated above in the example of FIGS. 7–9 (1.3800, 3.9800, 3.2000) is 3.9800.

Figure 10:
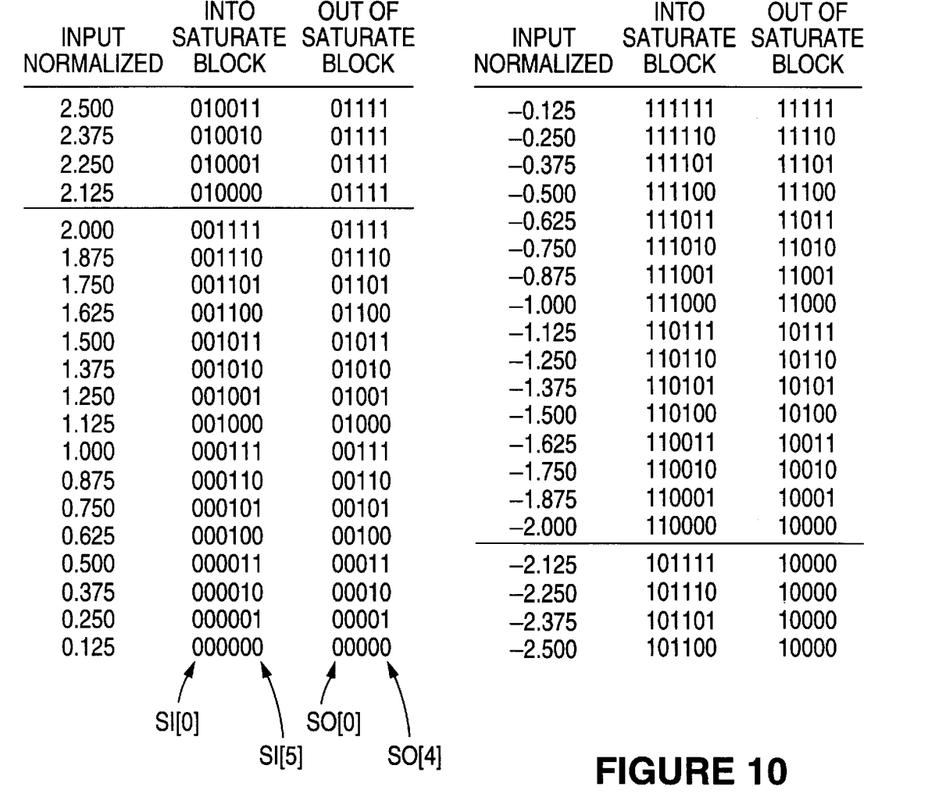
FIG. 10 is a table setting forth the y values flowing from an analog-to-digital converter into a saturate block and out of the saturate block to a EPR4 Viterbi detector in accordance with an embodiment of the invention.

FIG. 10 is a table setting forth the y values flowing from an analog-to-digital converter into a saturate block and out of the saturate block to a EPR4 Viterbi detector in accordance with an embodiment of the invention. The +ymaxideal for the Viterbi detector is +2.000 and the −ymaxideal for the Viterbi detector is −2.000. As can be seen, input values of +2.000 and greater are saturated to the five bit value 01111. Input values of −2.000 and less are saturated to the five bit value 10000. Input bit SI[0] is the most significant bit of the input y value and output bit SO[0] is the most significant bit of the output y value.

Figure 11:
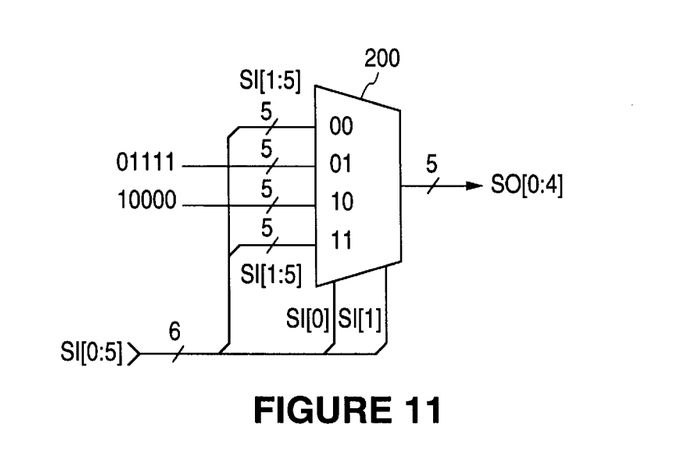
FIG. 11 is a simplified diagram of a way to realize the saturation of FIG. 10.

FIG. 11 is a simplified diagram of one possible way to realize the saturation of FIG. 10. When the two most significant bits of the input y value are "01", then the value "11001111" is multiplexed by 4-to-1, 5-bit, multiplexer 200 onto output y value bit lines SO[0:4]. When the two most significant bits of the input y value are "10", then the value "10000" is multiplexed by multiplexer 200 onto output y value bit lines SO[0:4]. When the two most significant bits of the input y value are "00" or "11", then the SI[1:5] input y values are passed through multiplexer 200 to the output y value bit lines SO[0:4].

Figure 12:
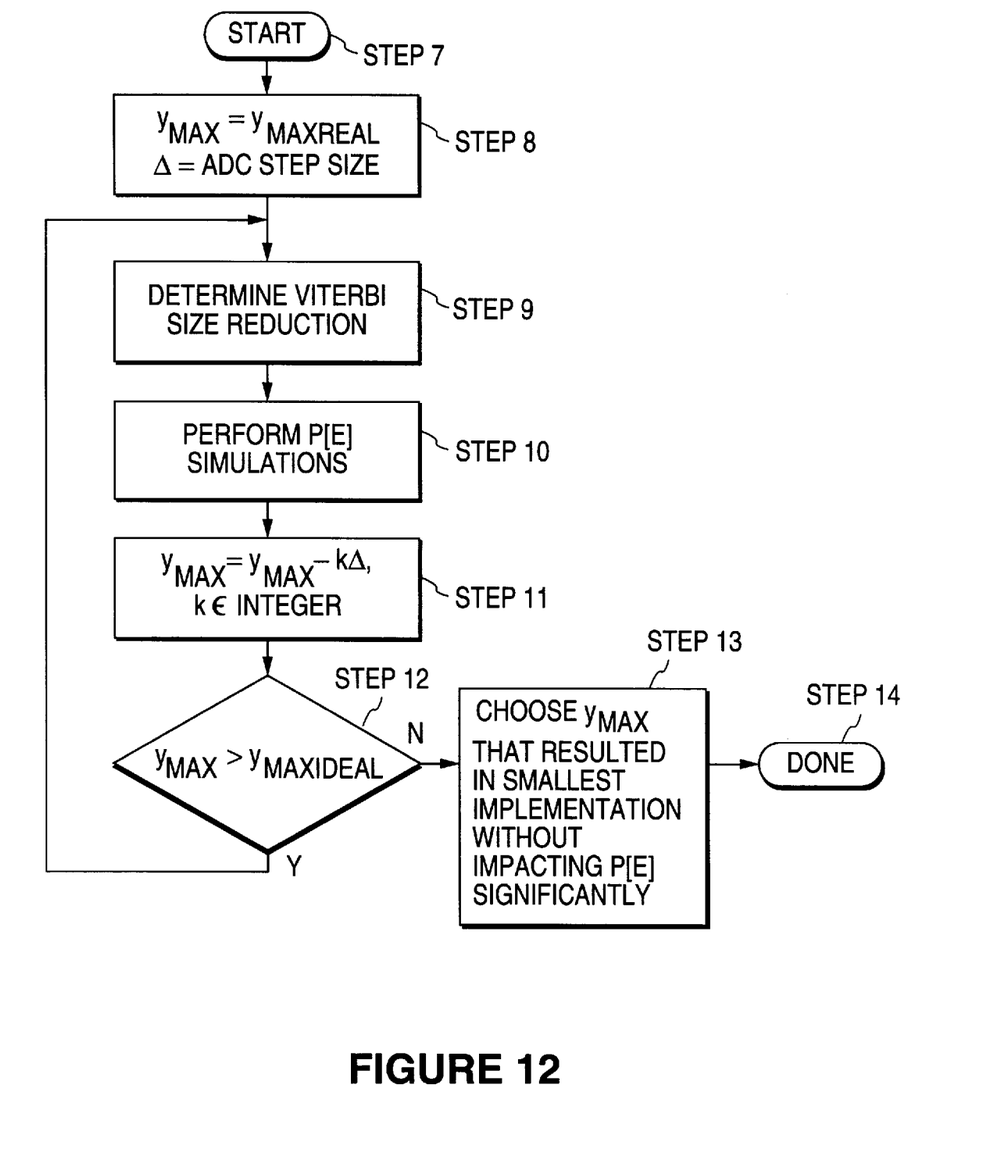
FIG. 12 is a flowchart illustrating a method in accordance with another embodiment.

FIG. 12 is a flowchart of a method in accordance with another embodiment. The method starts at step 7. In step 8, the value of ymax is set to ymaxreal. In step 9, the size reduction achieved in the Viterbi detector is determined. In step 10, a probability of error P[E] calculation is performed. In some embodiments, a bit error rate for an input having a given signal-to-noise ratio can be determined using a Mat-Lab simulation. In step 11, ymax is reduced by some integer of analog-to-digital converter steps. In step 12, if ymax is greater than ymaxideal, the method returns to step 9. Otherwise, the method proceeds to step 13. In step 13, the ymax is chosen that resulted in the smallest Viterbi implementation without impacting the probability of error P[E] significantly. The largest acceptable probability of error P[E] may be predetermined before step 13 in some embodiment. The method is complete at step 14. Accordingly, the size of the Viterbi detector is reduced in some embodiments without saturating the range of y values so far that the D of the Viterbi detector for the saturated y values is in a different "two to the power of an integer" range than the D of the Viterbi detector for unsaturated y values. These embodiments of how to realize a saturate block are presented only for illustrative purposes and it is understood that any suitable circuit or software could be employed. A lookup table, for example, could be employed. Numerous other realizations are possible.

Although the present invention is described in connection with certain specific embodiments for instructional purposes, the present invention is not limited thereto. The y values supplied to the maximum likelihood detector need not be saturated to ymaxideal. The invention extends to PRML systems employing maximum likelihood detectors other than Viterbi detectors and extends to PRML systems employing partial response schemes other than PR4, EPR4 and $E^2PR4$. Accordingly, various modifications, adaptations, and combinations of various features of the described embodiments can be practiced without departing from the scope of the invention as set forth in the following claims.

What is claimed is:

1. A partial response maximum likelihood (PRML) system, comprising:
    a gain control loop having an analog-to-digital converter, the analog-to-digital converter outputting y values having a first range defined by ymaxreal; and
    a maximum likelihood detector which receives and processes input y values having a second range and outputs therefrom a sequence of output y values in accordance with a partial response scheme, the second range being smaller than and being encompassed by the first range, the partial response scheme having an ideal maximum y value (ymaxideal), ymaxideal being within the smaller range, the maximum likelihood detector having a D and a related ymax, a relationship existing between D and ymax for maximum likelihood detectors which operate in accordance with the partial response scheme, and wherein the D of the maximum likelihood detector is in a smaller two to the power of an integer range than a D determined in accordance with the relationship using ymaxreal.

2. The PRML system of claim 1, wherein:
    if $1<D\leq2$, then D is in a first two to the power of an integer range;
    if $2<D\leq4$, then D is in a second two to the power of an integer range;
    if $4<D\leq8$, then D is in a third two to the power of an integer range;
    if $8<D\leq16$, then D is in a fourth two to the power of an integer range; and
    if $16<D\leq32$, then D is in a fifth two to the power of an integer range.

3. The PRML system of claim 1, wherein the partial response scheme is PR4, wherein the relationship between D and ymax is 2(ymax +1), and wherein ymaxideal is 1.

4. The PRML system of claim 1, wherein the partial response scheme is EPR4, wherein the relationship between D and ymax is 4(ymax), and wherein ymaxideal is 2.

5. The PRML system of claim 1, further comprising:
    means for saturating y values output from the analog-to-digital converter and for outputting saturated y values to the maximum likelihood detector.

6. The PRML system of claim 5, wherein the means for saturating saturates y values greater than ymaxideal to ymaxideal.

7. The PRML system of claim 5, wherein the means for saturating saturates y values to a range between +SAT and −SAT, +SAT being greater than ymaxideal, −SAT being smaller than −ymaxideal.

8. The PRML system of claim 1, wherein the maximum likelihood detector is a Viterbi detector.

9. A method, comprising the steps of:
    (a) determining a first D of a maximum likelihood detector given a partial response scheme and a first range of y values;
    (b) determining a second D of a maximum likelihood detector given the partial response scheme and a second range of y values, the second D being in a smaller two to the power of an integer range than the first D;
    (c) providing on an integrated circuit a gain control loop having the first range of y values; and
    (d) providing on the integrated circuit a maximum likelihood detector, the maximum likelihood detector receiving y values having the second range of y values.

10. The method of claim 9, further comprising the step of:
    saturating y values in the first range into y values in the second range and supplying saturated y values in the second range to the maximum likelihood detector.

11. The method of claim 9, wherein step (a) occurs after step (b).

12. The method of claim 9, wherein step (b) occurs after step (a).

13. A partial response maximum likelihood (PRML) system, comprising:
    a gain control loop having an analog-to-digital converter, the analog-to-digital converter outputting y values having a first range;
    a maximum likelihood detector which receives and processes input y values having a second range and outputs therefrom a sequence of output y values in accordance with a partial response scheme, the second range being smaller than and being encompassed by the first range, the partial response scheme having an ideal maximum y value (ymaxideal). vmaxideal being within the smaller range the maximum likelihood detector having a D and a related vmax, a relationship existing between D and ymax for maximum likelihood detectors which operate in accordance with the partial response scheme, and wherein the D of the maximum likelihood detector is in a smaller two to the power of an integer range than a D determined in accordance with the relationship using ymaxreal; and
    a saturate block which saturates the y values output from the gain control loop to the second range.

* * * * *